CONE & POTTER.
Wheel-Cultivator.
No. {1,409, 32,413.}
Patented May 28, 1861.
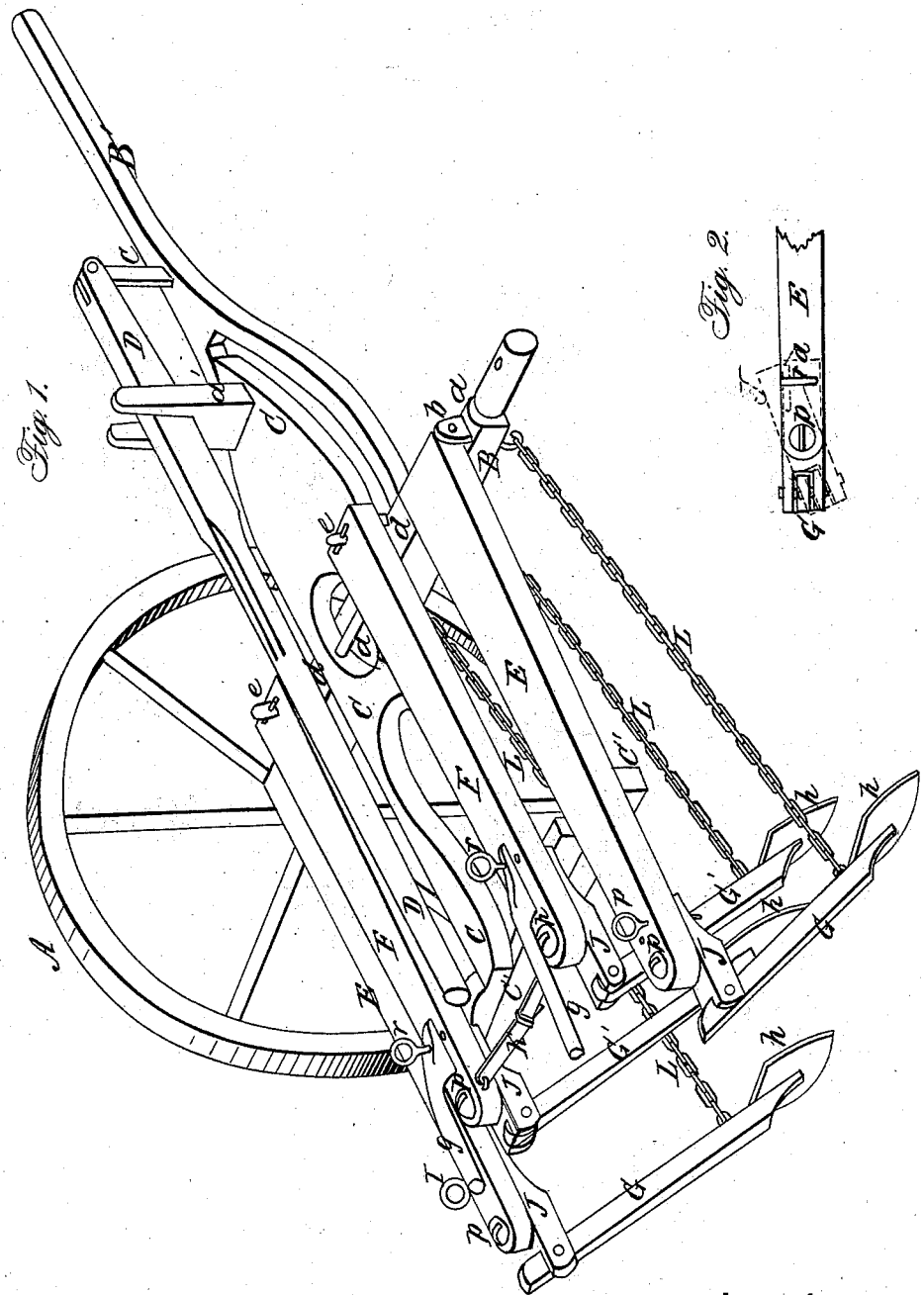
Witnesses:
Inventor:

UNITED STATES PATENT OFFICE.

T. S. CONE AND H. S. POTTER, OF ONEIDA, ILLINOIS.

IMPROVEMENT IN CULTIVATORS.

Specification forming part of Letters Patent No. 32,413, dated May 28, 1861.

*To all whom it may concern:*

Be it known that we, T. S. CONE and H. S. POTTER, of Oneida, in the county of Knox and State of Illinois, have invented a new and Improved Cultivator; and we do hereby declare that the following is a full, clear, and exact description thereof, reference being had to the accompanying drawings, making a part of this specification, in which—

Figure 1 is a perspective view of the improved cultivator with one wheel removed, to exhibit the attachment of the beams to the axle-tree. Fig. 2 shows in detail the manner of attaching the shovel-stocks to the rear ends of the jointed beams.

Similar letters of reference indicate corresponding parts in both figures.

This invention relates to certain novel means for adjusting the shovels of a cultivator and giving the plowman better control over the shovels than hitherto in guiding them between the rows of young or old crops.

The invention consists in the combination of pivoted beams and adjustable shovel-stocks with a pivoted carriage-frame, all constructed and arranged as will be hereinafter fully explained.

To enable those skilled in the art to make and use our invention, we will proceed to describe its construction and operation.

A is one of two large wheels on which the machine is supported and drawn about. B is the axle-tree of these wheels A, and B' is the draft-pole to which the horses are hitched, which pole is secured rigidly to the axle-tree B and braced, as shown in Fig. 1 of the drawings. A rod, $a$, is arranged along the top of axle-tree B, and supported at its ends and at intermediate points between its ends in eyes $b$, which are secured to the axle-tree B. The rod $a$ is therefore raised up slightly from the axle-tree and parallel with this axle-tree.

C is a wide beam, which is pivoted by rod $a$ to the axle-tree B. Bar C projects out in front of and also behind the axle-tree, and to its rear end is secured a transverse bar, C', which is intended for supporting the shovel-carrying beams, as will be hereinafter shown. A perpendicular fulcrum-post, $a'$, is secured to the top of and at the front end of pivoted beam C, over which passes, or between the bifurcated end of which passes a long lever, D, which is attached by a short strap, $c$, at its front end to the draft-pole B', and extends back over the transverse bar C', and can be attached to this bar by a hook or other device, when it is desired to raise the shovel from the ground for transporting the machine about from place to place. The lever D is used for raising or depressing the pivoted frame C C', and consequently the shovel-beams, which are supported at their rear ends on this frame.

E E are two long beams of a suitable length and strength, which are pivoted at their front ends to the ends of the rod $a$, as shown in Fig. 1 of the drawings, and extend back over the ends of transverse bar C'. The rear ends of these two side beams are thus allowed to rise and fall according to the inequalities of the ground over which the machine is drawn. Between the ends of beams E E and the central beam, C, collars or tubes $d$ $d$ are placed on the rod $a$, which collars have strong pins $e$ $e$ projecting perpendicularly from their surfaces.

To the pins $e$ $e$ the short middle beams, F F, are pivoted, as shown in Fig. 1 of the drawings. The rear ends of beams F F will thus be allowed to move laterally as well as vertically. These two beams F F project over the transverse bar C', and carry handles $g$ $g$, by means of which the plowman controls the movement of the shovels.

G G are the shovel bars or stocks of beams E E, and G' G' are the shovel-stocks of the middle beams, F F. Each one of these stocks carries a shovel, $h$, of any suitable shape, which is secured to the stock by bolts or in any convenient manner, and each stock is pivoted to the rear end of a bracket, J, which is secured to the lower side and rear end of its respective beam by a pivot-pin, $p$, and a removable pin, $r$, which, when removed, will allow the rear end of bracket J to be adjusted laterally, as indicated in Fig. 2 of the drawings in red lines, and secured again in the desired position. The object of thus adjusting the brackets J and shovel-stock is to turn the shovels more or less inward or outward for the better earthing of the rows of plants. The two beams F F are connected together at their rear ends by an adjustable transverse brace, K, which keeps these beams F F, and consequently their shovels, at the required distance apart, and by shortening the brace K the shovels can be set nearer together, according to the width of the rows under cultivation.

L L L L are chain braces connecting the lower ends of the shovel-stocks with the axle-tree B, as shown in Fig. 1, for resisting the backward strain on the shovels.

Having thus described our invention, what we claim as new, and desire to secure by Letters Patent, is—

The pivoted frame C C′, lever D, pole B′, beams E E and F F, pivoted to rod $a$, as herein described, in combination with adjustable pivoted brackets J J J and pivoted shovel-stocks G G G′ G′, all arranged as herein shown and described.

T. SCOTT CONE.
H. S. POTTER.

Witnesses:
 DIOGENES WETMER,
 N. H. WALWORTH.